United States Patent [19]

Gushue et al.

[11] 3,898,396

[45] Aug. 5, 1975

[54] AUTOMATIC VERIFICATION ANNOUNCER

[75] Inventors: Edward J. Gushue, Bedford Hills; Gerard Insolia, Katonah, both of N.Y.; Furrokh S. Irani, Bombay, India

[73] Assignee: Cognitronics Corporation, Stamford, Conn.

[22] Filed: Sept. 16, 1974

[21] Appl. No.: 506,264

[52] U.S. Cl......... 179/175.3 A; 179/6 C; 179/1 SM
[51] Int. Cl............................ H04b 3/46; G10l 1/10
[58] Field of Search.......... 179/175.3 A, 1 SG, 6 C, 179/1 SM; 324/66

[56] References Cited

UNITED STATES PATENTS

| | | | |
|---|---|---|---|
| 3,288,944 | 11/1966 | Fleming | 179/175.3 A |
| 3,586,780 | 6/1971 | Kezuka | 179/6 C |

*Primary Examiner*—Kathleen H. Claffy
*Assistant Examiner*—Douglas W. Olms
*Attorney, Agent, or Firm*—Parmelee, Johnson & Bollinger

[57] ABSTRACT

Test equipment for verifying trunk routing in a telephone system by developing, in response to a verification request, a series of spoken words identifying the area code and the telephone exchange to which the trunk under test is connected. The equipment includes a plurality of input channels each coupled to the verification line for a corresponding telephone exchange. A ringing signal on any channel is detected and a binary flag is set in an associated latch. All of the latches are scanned in rotational sequence by a multiplexer which, when a flag is detected, stops scanning and initiates a read-out operation from a speech-generating unit having a number of selectable speech signals stored in digital format in a read-only memory. Special logic circuitry is provided to identify the required telephone exchange digits, and to produce a read-out of the area code and exchange digits in sequence. The digits which are developed in response to a verification request are controlled by manually-insertable encoding keys, permitting customer modification of the predetermined voice response.

12 Claims, 5 Drawing Figures

AUTOMATIC VERIFICATION ANNOUNCER

BACKGROUND OF THE INVENTION

1. Field of the Invention

This invention relates to telephone circuit test equipment. More particularly, this invention relates to automatically-operable speech-generating equipment adapted to verify by spoken words the numbers of telephone exchanges, to provide for establishing proper trunk routing.

2. Description of the Prior Art

Telephone networks require substantial numbers of so-called trunk lines which connect together the various central offices of the system. Trunk lines are used to interconnect the principal exchange buildings within a city, and also to interconnect central offices in different cities. In some cases, trunk lines run directly from one city to another, while in other cases a trunk line may consist of a series of interconnected sections extending through a group of cities. Thus, one trunk line may go directly from, say, Stamford, Conn., to White Plains, N.Y., whereas another trunk line between those two cities may go first from Stamford, to Bedford, N.Y., then from Bedford to Mount Kisco, N.Y., and finally from Mount Kisco to White Plains.

In the day-to-day operation of a telephone system, the trunk line composition continuously undergoes changes and reassignments, so as to provide for optimum routing to meet demand. Trunk lines also require repair or other servicing, and for such purposes must at times be cut out from the network, and cut back in subsequently. Additionally, the operation of a telephone system is sometimes subject to reduced service capability leading for example to excessive customer waiting time, etc., and suitable means are needed to determine quickly whether such trouble has been caused by a trunk line failure.

Consequently, telephone maintenance craftsmen must be able to check rapidly not only whether a given trunk line is operational, but also that it goes to the correct telephone exchange. For example, a craftsman working at an OGT (outgoing trunk) board, located in one central office, may after completion of a cable cut-over need to check out a series of trunks intended to provide connections to different exchanges at another central office. (All of these exchanges may actually be located in the same central office building, but this need not be so). In the past, the craftsman performed this check by dialing through the trunk line under test, a special code number (e.g. 6601) at the exchange to which the trunk is to go. The local exchange operator would answer the call to the dialed code number, and verify trunk routing to the exchange. If the dialed exchange is the same as that identified by the operator answer-back, correct trunk routing is confirmed.

The telephone company craftsmen frequently perform much of their routing and rerouting work at night, in order to minimize day time service disruption. However, many of the operator boards (i.e., the so-called "A" boards) are now closed at night, so that the verification function often is not readily available to the craftsmen. With the reduced number of operators, those available may likely be handling other calls, resulting in delays or unanswered verification checks. Also, the operator, being human, may be hurried or distracted, possibly causing further delays in achieving the desired result.

SUMMARY OF THE INVENTION

In a preferred embodiment of the present invention, described hereinbelow in detail, there is provided an automatically-operable audio-response device which is installed at a central exchange office for testing incoming trunk lines. This device, referred to herein as an automatic verification announcer, has 10 separate channels to provide a capability of handling verification calls to ten different telephone exchanges. The 10 channels of the device are connected to corresponding exchange lines which the routing craftsmen can call for trunk verification.

Each of the exchange channels of this verification device contains a tuned circuit adapted to detect the 20 Hertz ringing current produced when the corresponding exchange verification line is activated. Detection of this ringing current sets a binary "flag" in a latch circuit corresponding to the activated channel. All of the ten channel latches are polled (i.e., scanned) continuously in fixed, rotating sequence. When a flag is detected, the verification device goes "off hook" on the corresponding line, interrupts the ringing current, and develops a "start-voicing" signal for an associated speech-generating unit. This start signal causes the speech-generating unit to send to the activated line audio signals representing spoken words identifying the area code of the associated central office, and the three digits of the telephone exchange corresponding to the selected channel.

This verification signal is sent over the trunk under test back to the craftsman requesting the verification. At the end of voice output, the equipment automatically goes back to its "on hook" condition and continues polling for the next flag. Total polling time for all channels is less than one-tenth of a second. Total time required to voice the area code and exchange digits averages about 3.5 seconds per inquiry.

Each automatic verification announcer provides means for simple and rapid change of the particular area code and exchange digits to be voiced by the speech-generating unit. These digits are determined by encoding keys, one for each digit, which are inserted into corresponding slots at the front panel of the equipment. These encoding keys carry large printed numerals corresponding to the spoken digits which will be voiced by the speech-generating unit in response to activation of the corresponding exchange verification line.

The equipment disclosed hereinbelow utilizes allsolid-state elements, thus avoiding required or preventive maintenance, and is available 24 hours a day to perform the required verification function in an economical fashion.

Accordingly, it is a general object of the invention to provide improved test equipment for checking and verifying telephone trunk line routing. A more specific object of the invention is to provide such apparatus which is reliable in operation with little or no maintenance, and which can handle rapidly a relatively large volume of trunk verification requests for a number of separate exchanges. Other specific objects, aspects and advantages of the invention will in part be pointed out in, and in part apparent from, the following description of a preferred embodiment of the invention, considered together with the accompanying drawings.

DESCRIPTION OF THE PREFERRED EMBODIMENT

Figures 1, 2:
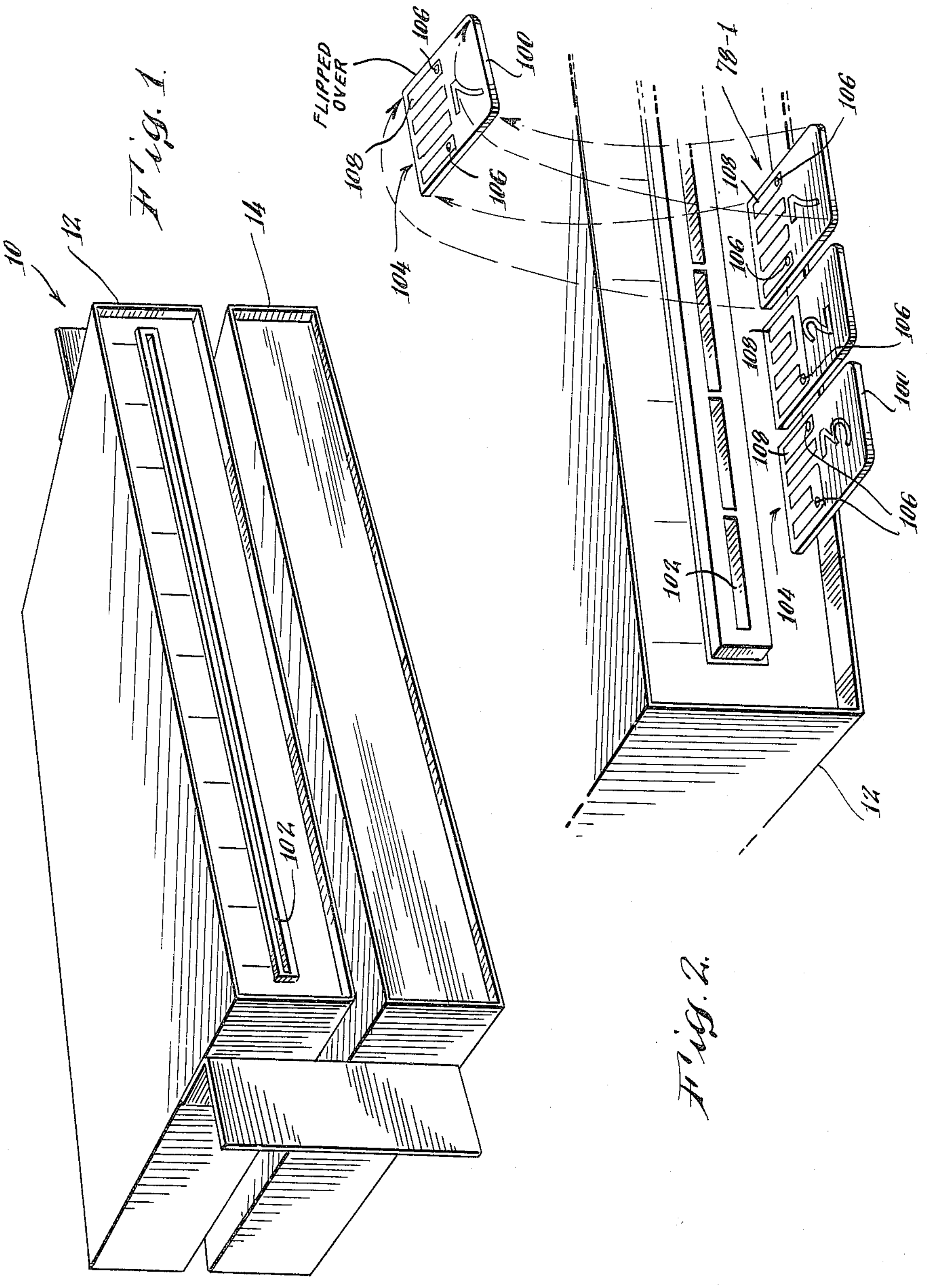
FIG. 1 is a perspective view showing an automatic verification announcer in accordance with this invention.
FIG. 2 is a detail view showing the replaceable encoding key arrangement.

Referring now to FIG. 1, there is shown in perspective an automatic verification announcer, generally indicated at 10, comprising a lower unit 12 providing speech-generating apparatus, and an upper unit 14 containing control logic circuit elements for controlling the speech-generating unit, as described in detail hereinbelow. Detailed design data respecting the speech-generating unit is set forth in copending application Ser. No. 470,116, filed by D. H. Shepard et al. on May 15, 1974, and reference to that application should be had for such details. In general, however, this speech-generating unit 12 includes read-only memory elments in which are stored sets of digital data representing audio speech patterns of the 10 spoken digits ("zero" through "nine"), together with associated circuitry for reading out any selected set of digital data in proper sequence and converting such digital data to analog output signals corresponding to the audio sound of the selected spoken word. These analog output signals are developed on a two-wire output line, and are coupled to the trunk line under test to provide the requesting craftsman with the required verification information.

Figure 3A:
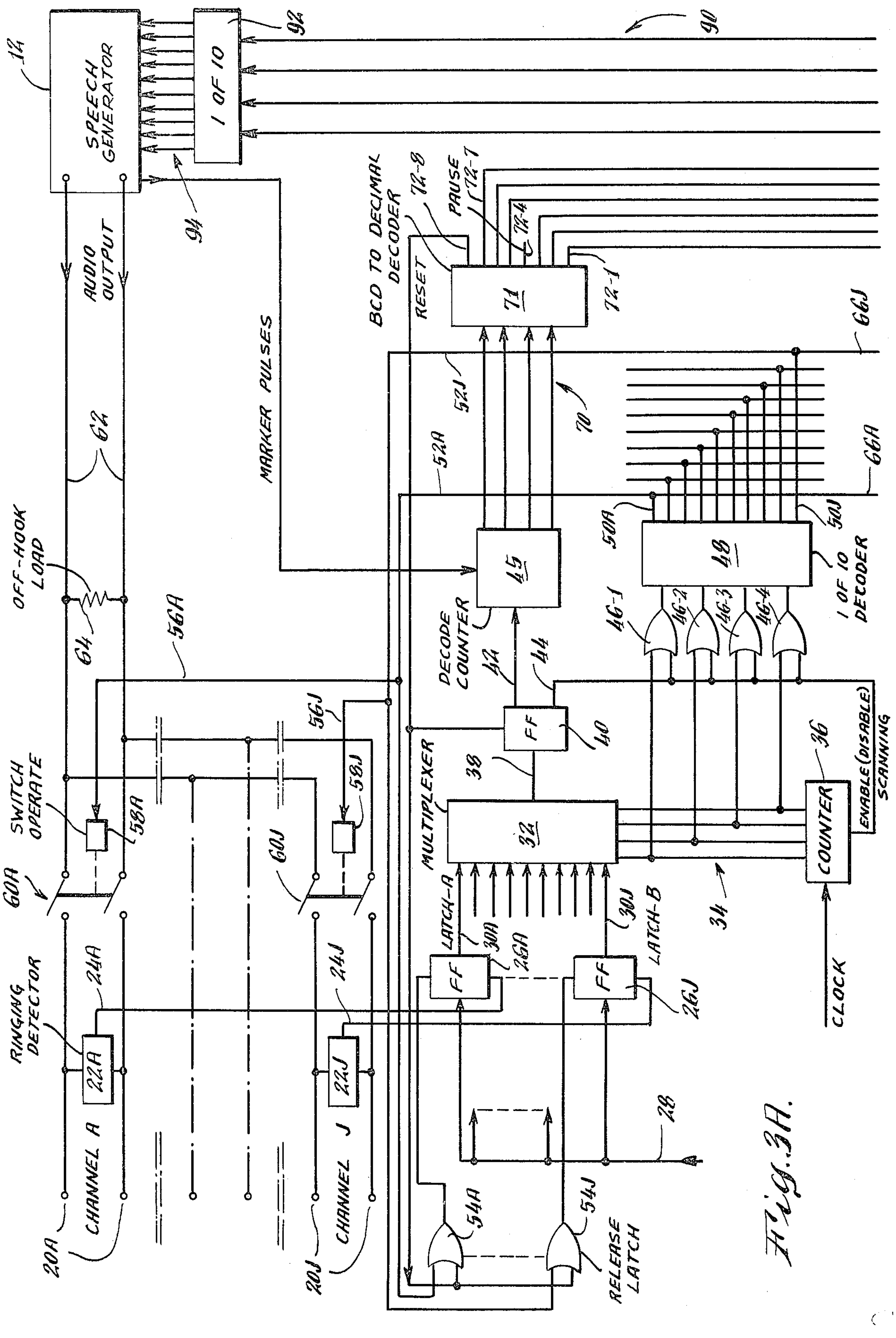
FIGS. 3A and 3B together present a circuit diagram, partly in block format, showing details of the verification announcer equipment and its system arrangement.
Figure 3B:
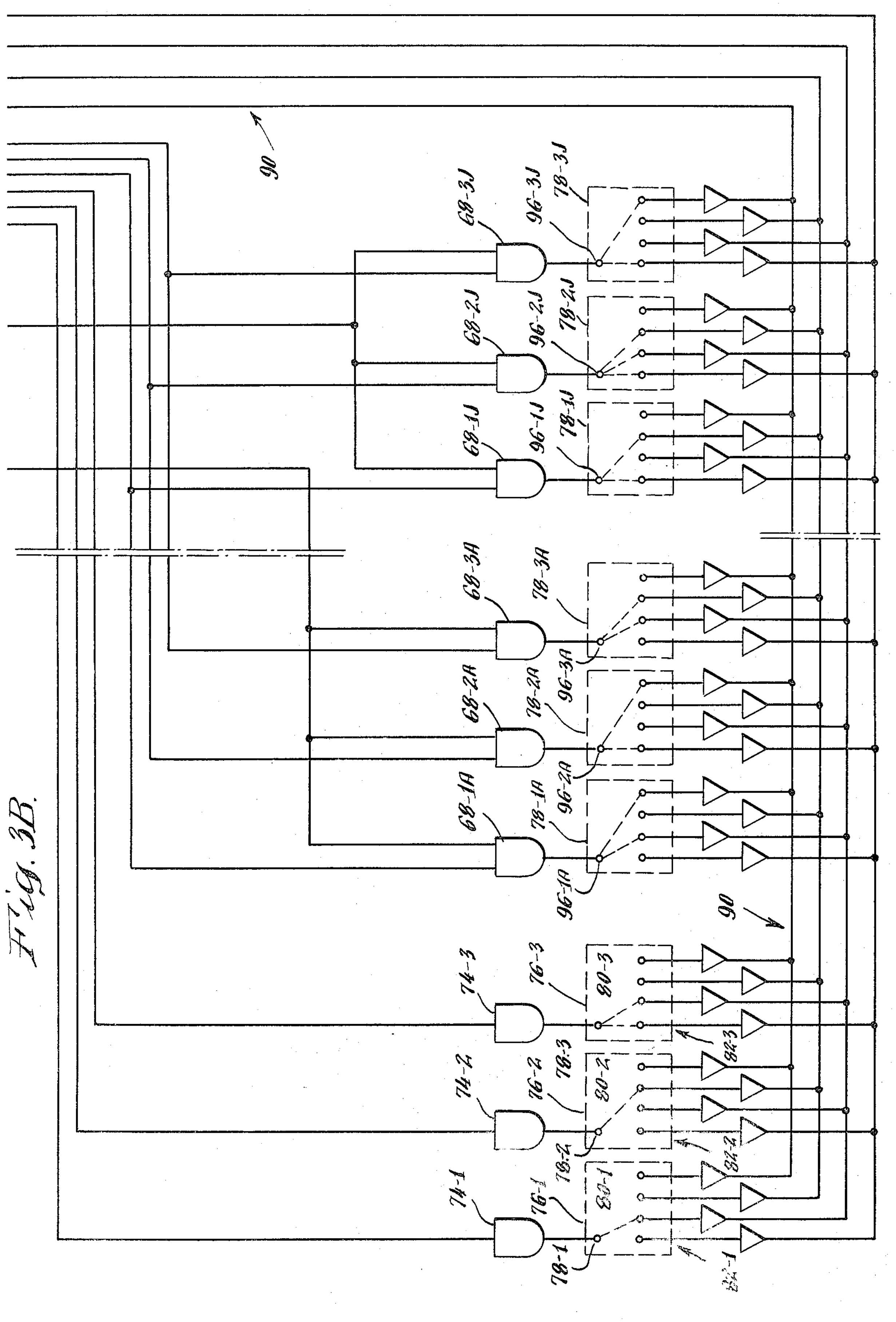

The overall system arrangement of the presently preferred apparatus is shown in the circuit diagram formed by FIGS. 3A and 3B. Referring first to the upper left-hand corner of FIG. 3A, the apparatus includes ten input circuit channels 20A–20J each consisting of a conventional tip and ring pair. Each such channel pair is connectible to the incoming verification line (not shown) of a corresponding telephone exchange, providing a capacity of handling up to ten separate exchanges. The verification line of any exchange is activated with ringing current in response to the outside dialing of a special code number, known to the telephone craftsman.

Connected in each input circuit channel 20A, etc., is a corresponding ringing detector 22A, etc. adapted to respond to the telephone ringing signal, typically a 20 Hertz current. When such ringing signal is sensed, the detector produces on its output line 24A, etc., a control signal (or start-voicing signal) which is directed to a corresponding signal-conditionable memory device 26A. This device preferably is a flip-flop latch of known construction, such as a D-type flip-flop.

When electrical power to the equipment is first turned on, a line 28 is provided (by conventional means, not shown) with a rising voltage logic signal which is fed to the CLK inputs of all of the D-type latches 26A, etc. The D-inputs of these latches are maintained high, and consequently the equipment power turn-on clock signal produces on the latch output lines 30A, etc., corresponding high signals. This is the normal state of the output lines, in the absence of a control signal from one of the ringing detectors 22A, etc.

When a ringing detector signal is received on the CLR input of the corresponding latch 26A, etc., the latch output line 30A, etc., goes low, and stays low until the latch is subsequently reset at the end of the voicing operation. This low signal on the latch output line serves as a binary "flag," to indicate that a verification request has been received on the corresponding channel.

All of the latch output lines 30A, etc., are connected to respective input terminals of a scanning multiplexer 32, e.g. of the type identified as SN74150N. The scan sequencing or "polling" of this multiplexer is controlled by binary signals on four lines 34 which are driven by the output of a binary counter 36, e.g. of the type identified as SN74161N. This counter receives clock pulses from a conventional clock-pulse generator (not shown), and produces corresponding binary counts on the lines 34 in known fashion. The clock pulses are generated at a rate sufficiently high to insure multiplexer scanning of all 10 lines 30A, etc., in a relatively short time, e.g. less than about 0.1 seconds for a complete scan cycle.

Whenever the multiplexer 32 detects a low signal (flag) on any of the incoming lines 30A, etc., it produces a corresponding rising (high) signal on its output line 38, indicating that a voicing operation is to be initiated. This line controls the CLK input to a D-type flip-flop 40 which, when activated, produces corresponding signals on the flip-flop output lines 42, 44. The signal on line 42 turns on a decode counter 45 which (as will be explained) controls the sequencing of the speech-generating unit 12. The signal on line 44 disables the counter 36, so that the counter output remains at the binary count number which identifies the signalling input channel 20A, etc.

The signal on line 44 also opens a set of gates 46-1, etc., through which the binary count number of the stopped counter 36 is directed to a 1-of-10 decoder 48, e.g. of the type identified as SN74145N. This decoder thereupon activates one of its ten output lines 50A–50J, in accordance with the binary count of counter 36 which identifies the input channel on which the ringing current appeared.

The signal on the activated output line 50A–50J performs three functions: (1) The signal is directed through one of 10 lines 52A–52J to open a corresponding gate 54A–54J, so as to provide for ultimate resetting of the activated latch at the end of the voicing operation. (2) The signal also is directed through one of another 10 lines 56A–56J to activate a corresponding switch-operate circuit 58A–58J arranged to close one pair of 10 pairs of switches 60A–60J connecting the corresponding channel line pairs 20A–20J to the output lines 62 of the speech-generating unit 12. These output lines also are provided with a bridging resistor 64 serving as the off-hook load for the so-connected telephone line pair. (3) The signal on the selected line 50A–50J further is directed through a corresponding one of 10 lines 66A–66J to activate a corresponding three-gate set of 10 such three-gate sets 68-1A; 68-2A; 68-3A; — 68-1J; 68-2J; 68-3J, to condition the associated circuits for developing output signals identifying a three-digit set of exchange numbers to be voiced by the speech-generating unit 12.

The decode counter 45, referred to above, is clocked by so-called marker pulses produced by the speech-generating unit 12. When the unit 12 is inactive (i.e., not voicing), these marker pulses are produced (by conventional means, not shown) approximately every 0.3 seconds. During a voicing operation, a marker pulse is produced at the end of each spoken word (the durations of which vary somewhat), to indicate that the speech-generating unit has completed voicing of one word and is prepared to voice another word.

After the counter 45 has been activated by the signal on flip-flop line 42, the next marker pulse received will start the count operation to produce a corresponding binary number on the four count lines 70. These lines control a BCD-to-Decimal converter 71 which may, for example, be of the type identified as SN7442N. As the binary count proceeds in response to marker pulses, the converter output lines 72-1, etc., are activated in sequence, to control the voicing of the desired numbers by the speech-generating unit 12.

The sequential activation of the three lines 72-1, 72-2 and 73-3 turns on three gates 74-1, etc., in sequence, to apply corresponding signals to three manually settable switch circuits 76-1, etc. Each of these circuits includes a single input terminal 78-1, etc., and manually settable connection means 80-1, etc., to establish conductive connection between the input terminal and any of four output terminals 82-1, etc. Thus, when any switch circuit input is activated, its output terminals produce a four-element parallel-binary code signal corresponding to the connections pre-established by the conductive connection means 80-1, etc.

These three four-element code signals define respective numbers (i.e., digits selected from "zero" to "nine") corresponding to the area code for the central office in which the verification announcer 10 is located. The announcer first voices these digits out over the activated channel 20A, etc.

For this purpose, the three sequentially-produced code signals are directed through respective sets of amplifiers to a common set of four selection-controlling lines 90 for the speech-generating unit 12. These lines transfer each code signal, in sequence, to a 1-of-10 decoder 92 which forms part of the selection means of unit 12, and which for such purpose activates one of 10 input or selection lines 94 for unit 12. The particular line activated is determined by the binary code of the signal developed on controlling lines 90. Any of the 10 input lines 94, when activated, causes the speech-generating unit 12 to voice a corresponding one of the 10 spoken numbers.

When the first switch circuit 80-1 is activated, following receipt by decode counter 45 of the first marker pulse, a corresponding code signal is applied to decoder 92 to cause the speech-generating unit 12 to voice the first digit of the three area code digits, identified by the first switch-circuit 76-1. After that voicing operation, unit 12 produces another marker pulse, thereby activating switch-circuit 76-2, and applying a new code signal to decoder 92 which thereupon selects the next digit in the area code. The third area code digit is produced in the same way.

After the area code has been voiced, the decoder 71 steps to output line 72-4 which is blank, and thereby provides a slight pause before voicing the next three digits for the exchange number. Activation of output line 72-5 directs corresponding signals to the first gate 68-1A, etc., of each of the 10 sets of three gates referred to above. As described earlier, one of the three-gate sets has at this time already been turned on by a corresponding signal over one of the decoder output lines 66A, etc. Thus, activation of output line 72-5 directs a corresponding signal through the first gate 68-1A, etc., of the three-gate set which had already been turned on.

The output of such activated gate 68-1A, etc., is directed to the input terminal 96-1A, etc., of a corresponding manually settable switch-circuit 98-1A, etc. This circuit is identical to the switch-circuits 76-1, etc., previously described, and produces on the common code-signal line 90 a four-element binary signal which in the manner set forth above determines the next digit to be voiced by the speech-generating unit 12. This digit is the first of the three exchange digits. After that first digit has been voiced, the decoder 71 is advanced by the next marker pulse to activate line 72-6, thereby to voice the second exchange digit as determined by the connections of the next switch-circuit of the selected set of three switch-circuits. The third exchange digit is selected and voiced in the same way, in accordance with the connections established by the third switch-circuit of the selected set.

The verification voicing operation now is complete, and the equipment automatically resets itself to respond to the next verification request. For this purpose, the decoder 71 steps to its last output line 72-8 which directs a reset signal to various circuits. Specifically, this reset signal first is used to turn on the release-latch gates 54A, etc., to allow the release signal from the previously-selected line 52A, etc., through to the corresponding latch 26A, etc., thereby resetting the latch to its original state. The reset signal also goes to flip-flop 40 to return the output lines 42, 44 to their original state. This deactivates the decoder counter 45, returning it to its original count condition, and also turns off gates 46-1, etc. to cut off the input signal to the decoder 48. With decoder 48 turned off, its previously activated output lines go low and deactivate the switch-operate circuit 38A, etc., the release latch gates 54A, etc., and the switch gates 68-1A, etc. The signal on line 44 also re-enables the counter 36 which recommences the multiplex scan operation, to scan the latches 26A, etc., for the next verification request flag.

FIG. 2 shows a preferred arrangement of the manually-settable switch-circuits identified in FIG. 3B at 76-1 and 98-1A. In this arrangement, each of the switch-circuits includes an encoding key 100 in the form of a small, flat tab-like element which is manually insertable into a corresponding slot-like receptacle 102 on the front panel of the equipment. Each key serves to select a corresponding digit to be voiced by the speech-generating unit, including the three-digit area code, and the three-digit exchange codes. Thus, there will be 33 keys in total, three for the area code and 30 for the 10 input channels.

Each key 100 is formed of insulating material carrying a thin layer of copper 104 arranged in a special geometrical pattern unique to the digit to be selected by the particular key. The copper serves as the connection means 80-1, etc., of the switch circuits previously described in FIG. 3B, and operable to establish a predetermined set of connections between the input terminal 78-1 and the four output terminals 82-1. To that end, each receptacle is provided with conductive means defining those input and output terminals, and adapted to contact and cooperate with the conductive copper connection means 80-1 on the key surface, when the key has been inserted into the corresponding slot, so as to establish the particular set of unique interconnections to develop a code signal for the corresponding digit.

In the preferred embodiment, the key 100 is formed on both top and bottom surfaces with conductive material 104 arranged in the same geometrical pattern, to permit the key to be inserted with either surface up and still function correctly. The switch connections are established by conductive paths through the key, from the upper conductive material 104 to the corresponding lower conductive material. This connection can for example be effected by means of a so-called plated-through hole, as illustrated at 106. In such arrangement, the receptacle is provided in its upper region with a single input terminal 78-1 arranged to engage and make contact with the right-most conductive segment 108. The lower region of the receptacle includes four laterally-spaced output terminals 82-1 arranged to engage and make contact with the correspondingly located conductive segments 104 on the lower surface of the key 100, the actual connections in each case depending upon the particular geometry of the conductive segments. Thus, the electrical path in, say, the key for number "7" passes from the upper input terminal 78-1 to the right-hand upper conductive segment 108, from there through the plated-through hole 106 to the right-hand lower conductive segment (which would be the left-hand segment if the key were flipped over), and then to the lower right-hand output terminal which engages that lower segment.

Each key 100 also carries on both top and bottom surfaces, in large outline, symbolic indicia representing the digit which the key selects when inserted in a slot 102. The keys can readily be removed and replaced with different keys, in order to change the digits that will be voiced. Thus, this feature provides a very flexible arrangement permitting simple alteration of the voiced digits by the user of the equipment.

Figure 4:
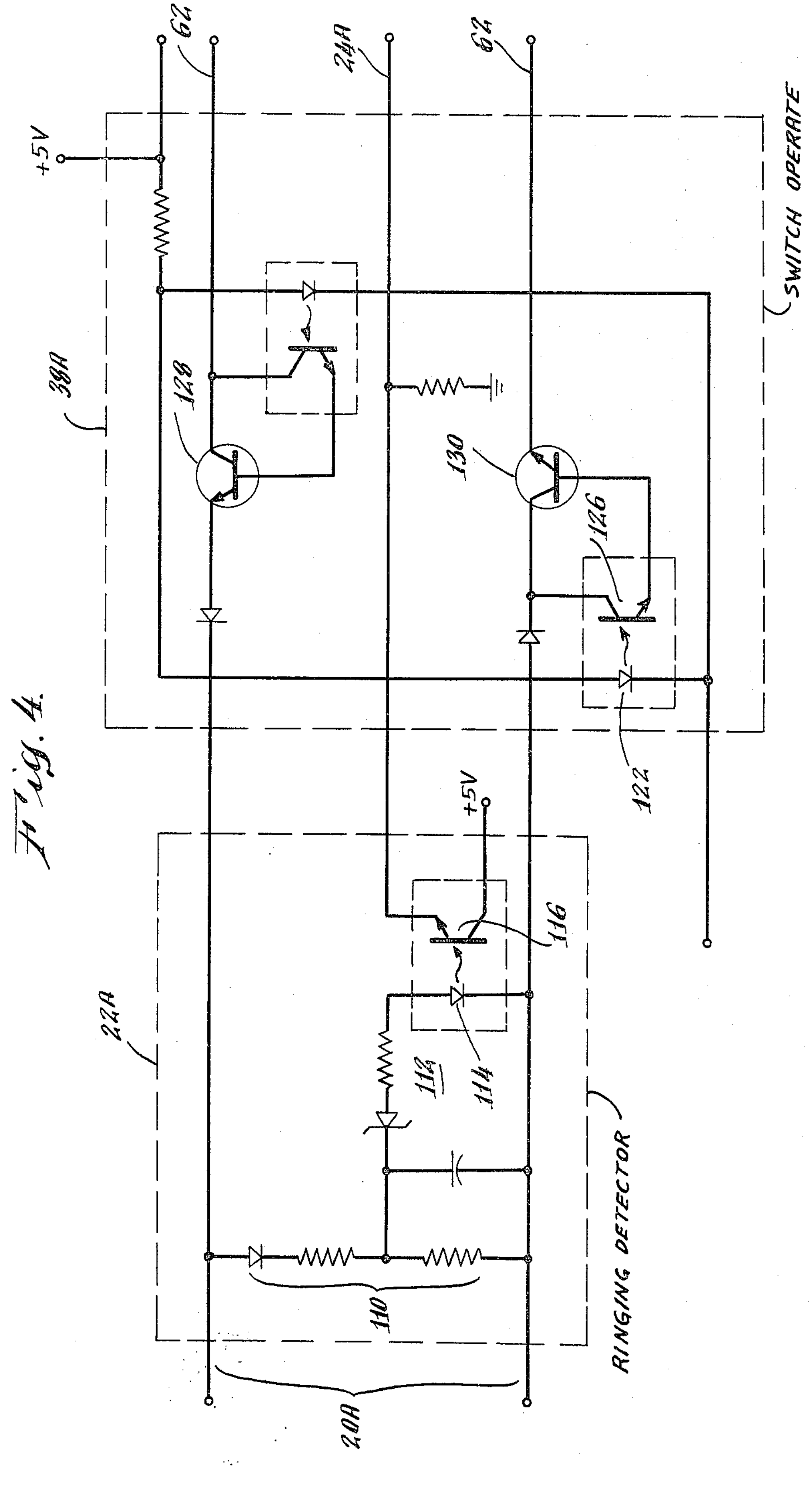
FIG. 4 is a diagram showing one example of suitable ringing detector and switch-operate circuits.

FIG. 4 shows preferred circuitry for the ringing detector 22A and the switch-operate circuit 38A, indicated in block outline on FIG. 3A. The ringing detector includes a diode and resistor network 110 to couple the ringing signal to a low-pass filter circuit 112 permitting the 20 Hertz ringing current to pass through to a light-emitting diode (LED) 114. This diode forms part of an opto-coupler adapted to cause conduction through a semi-conductor element 116 to produce the desired control signal on line 24A.

The switch-operate circuit 38A is activated by a negative signal on line 56A, causing a flow of current through two paralleled light-emitting-diodes 120, 122. These diodes provide opto-coupling to effect conduction through respective semi-conductors 124, 126, thereby placing a signal on the bases of transistors 128, 130 respectively connected in series with the two leads of the speech-generating unit output line 62. These transistors are thereby rendered conductive, in effect closing switches between output line 62 and the activated channel input circuit 20A.

Although a specific preferred embodiment of the present invention has been described hereinabove in detail, it is desired to point out that this is for the purpose of illustrating the invention, and should not be construed as necessarily limiting of the invention, since it is apparent that those skilled in this art will be able to modify the particular form in which the invention is expressed in order to suit the needs of different applications.

We claim:

1. For use in providing verification of telephone trunk lines terminating at a central office having one or more separate exchanges, wherein the telephone maintenance craftsman will call in on a trunk line under test by dialing the exchange number followed by a designated code number assigned to a verification line for the corresponding exchange; verification announcer apparatus comprising, in combination:

input circuit means providing a plurality of separate channels each adapted to be coupled to a respective verification line and over which a ringing signal is received when that line is activated in response to a call through a trunk line;

detection means for each of said input circuit means channels, said detection means being responsive to said ringing signal and operable to produce a control signal to initiate the functioning of the verification announcer apparatus;

a plurality of signal-conditionable means coupled to said detection means respectively to receive the corresponding control signal;

multiplexing means arranged to rapidly scan said signal-conditionable means in fixed sequence and to provide an indication whenever one of said control signals has been detected during such scanning;

said multiplexing means including channel-identifying means operable upon detection of a control signal to identify the channel of said input circuit means on which the ringing signal was received;

speech-generating means arranged upon activation to produce audio signals representing any of a set of spoken numbers;

selection means coupled to said speech-generating means to provide for selecting particular spoken numbers from the available set of spoken numbers;

exchange-identifying means under the control of said channel-identifying means and including means for producing output signals indicating for each identified channel a corresponding set of exchange numbers;

means coupling said exchange-identifying output signals to said selection means to cause said speech-generating means to produce a series of spoken numbers corresponding to the identified exchange; and means under the control of said channel-identifying means to direct each series of spoken numbers to the input circuit means channel on which the corresponding ringing signal was received.

2. Apparatus as in claim 1, wherein said signal-conditionable means comprises a plurality of memory devices activatable to a predetermined state upon receipt of said control signal, and operable to maintain such state until released.

3. Apparatus as in claim 1, wherein said multiplexing means includes as the driver therefor a binary counter;

clock means coupled to said counter to step the counter output rapidly through its count sequence, thereby to correspondingly advance the multiplexer scan position;

said counter providing count output signals indicating the scan position of the multiplexer at any given time, and thereby identifying the selected channel; and means to disable said counter upon detection of a control signal, whereby the count signal at that time identifies the called channel.

4. Apparatus as in claim 3, wherein said exchange-identifying means comprises a binary decoder coupled to the output of said counter and operable to activate one of a plurality of output lines each corresponding to one of said channels.

5. Apparatus as in claim 4, wherein said exchange-identifying means further comprises a plurality of coding means each corresponding to a respective channel and each including a set of manually settable switches, each of said switches being arranged when activated by an energizing signal to produce a predetermined multi-element code signal corresponding to a particular digit;

read-out means to activate the switches of any set of switches in sequence, so as to produce a corresponding set of code signals identifying the telephone exchange corresponding to the activated channel;

said set of code signals being directed to said selection means to control the speech signals produced by said speech-generating means.

6. Apparatus as in claim 5, wherein said speech-generating means includes means producing a marker pulse when said speech-generating means is ready to develop a spoken word; and means utilizing said marker pulses to control said read-out means to produce said sequence of code signals in proper time for operating said speech-generating means.

7. Apparatus as in claim 1, wherein said exchange-identifying means for producing output signals comprises a group of coding means each corresponding to a respective channel and being separately activatable to produce corresponding sets of selection signals for said speech-generating means.

8. Apparatus as in claim 7, wherein each coding means comprises a set of manually settable switch circuits each having an input terminal and a plurality of output terminals;

each switch circuit including means responsive to energization of its input terminal and operable to produce on its output terminals a multi-element code signal having a code characteristic determined by the manual setting of the respective switch circuit, said code characteristics serving to identify a particular spoken number;

means to direct said code signals to said selection means; and means to activate in sequence the individual switch circuits of any one of said coding means, whereby to produce a sequential series of code signals identifying the digits of the exchange corresponding to the selected channels.

9. Apparatus as in claim 8, wherein said switch circuits each comprise a key receptacle and a manually removable encoding key therein;

each encoding key corresponding to a particular digit and including switch connection means unique to such digit;

said key receptacles including means cooperable with said switch connection means to produce the code signal corresponding to said particular digit.

10. Manually settable apparatus for selectively producing a series of audio signals representing spoken words and comprising:

speech-generating means of the type having a set of stored speech signals and including selection means responsive to selection signals for controlling the audio output so as to produce a sequential set of desired spoken words;

a group of coding means each individually activatable for producing a corresponding code signal to be directed to said selection means to cause said speech-generating means to produce a corresponding spoken word;

each of said coding means comprising a switch circuit having an input terminal and a plurality of output terminals on which a multi-element code signal will appear when said input terminal is activated;

each switch circuit further comprising a key receptacle and an encoding key inserted in said receptacle, said key being readily removable and replaceable by a different key to change the coding characteristics of the corresponding switch circuit;

said key including conductive means in a geometric pattern unique to the digit to be developed by insertion of said key and arranged to cooperate with said receptacle to effect a predetermined set of connections between said input and output terminals to produce a corresponding code signal unique to the particular digit.

11. Apparatus as claimed in claim 10, wherein each encoding key comprises a flat tab-like element adapted to be inserted in a corresponding slot of said receptacle.

12. Apparatus as claimed in claim 11, wherein each key is provided with symbolic indicia indicating the particular digit to be developed in response to the code signal developed by that key.

* * * * *